United States Patent [19]
Kalishman

[11] 4,374,784
[45] Feb. 22, 1983

[54] AIR AND MOISTURE INDUCTION SYSTEM

[76] Inventor: Calvin Kalishman, 5 Margaret Rd., Stoneham, Mass. 02180

[21] Appl. No.: 233,991

[22] Filed: Dec. 12, 1981

Related U.S. Application Data

[63] Continuation of Ser. No. 213,819, Dec. 8, 1980, Pat. No. 4,313,740.

[51] Int. Cl.$^3$ ............................................. F02M 25/00
[52] U.S. Cl. ................................... 261/18 A; 55/510; 55/527; 55/488; 55/256; 123/25 A; 123/25 E
[58] Field of Search .............. 261/DIG. 66, 18 A, 66; 55/256, 510, 131, 488, 527; 123/25 A, 25 E, 25 L, 25 R

[56] References Cited

U.S. PATENT DOCUMENTS

| | | | |
|---|---|---|---|
| 1,355,094 | 10/1920 | Ihrig | 261/18 A |
| 1,395,833 | 11/1921 | Kling et al. | 55/487 |
| 1,560,790 | 11/1925 | Jordahl | 55/487 |
| 2,579,441 | 12/1951 | Palmer | 55/131 |
| 3,790,139 | 2/1974 | Stephenson et al. | 123/25 L |
| 3,865,907 | 2/1975 | Rock | 261/18 A |
| 3,975,466 | 8/1976 | Bradshaw | 261/18 A |
| 4,016,837 | 4/1977 | Wentworth, Jr. | 123/25 R |
| 4,074,985 | 2/1978 | Willas | 55/500 |
| 4,187,136 | 2/1980 | Nostrand | 210/489 |
| 4,257,791 | 3/1981 | Wald | 55/487 |

FOREIGN PATENT DOCUMENTS 2601456  7/1977  Fed. Rep. of Germany ... 261/18 A

*Primary Examiner*—Bernard Nozick
*Attorney, Agent, or Firm*—Wolf, Greenfield & Sacks

[57] ABSTRACT

The system is adapted to improve the efficiency and smooth operation of the automobile engine and reduce pollutants expelled from the engine. The normal carburetion function is supplemented by a vacuum induction technique to supply saturated (moisture laden) air to the carburetor where it is mixed with the existing gasoline vapor passing through the carburetor throat. The system is a feedback type using air pressure, preferably filtered by the vehicle air filter (cleaner), coupled to a fuel-water liquid tank where the air passes through the liquid to provide a liquid saturated air source that feeds back to the carburetor throat preferably just above the throttle plate.

7 Claims, 4 Drawing Figures

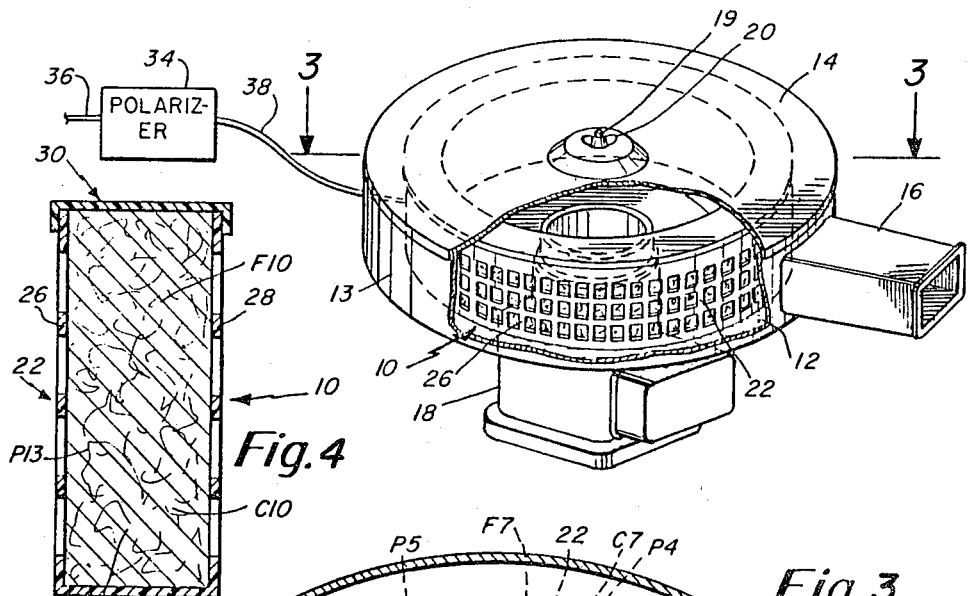
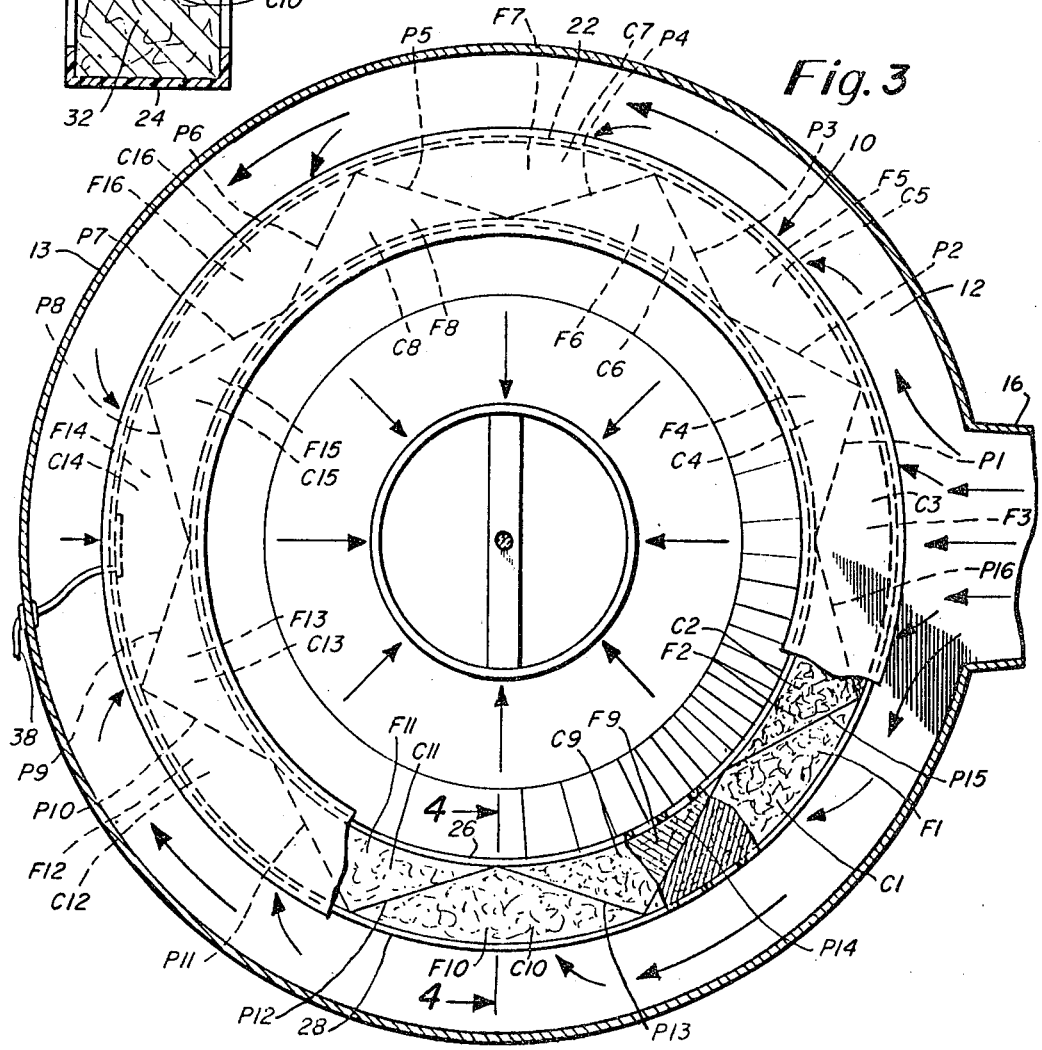

AIR AND MOISTURE INDUCTION SYSTEM

RELATED APPLICATION

This is a continuation in part of application Ser. No. 213,819 filed Dec. 8, 1980, now U.S. Pat. No. 4,313,740 issued Feb. 2, 1982.

BACKGROUND OF THE INVENTION

The present invention relates very generally to the automotive field and pertains, more particularly, to a system for increasing gasoline mileage and also reducing pollutants in the emissions from a vehicle engine. There is disclosed herein a vacuum induction system for supplying saturated air to the vehicle carburetor for mixture with the gasoline vapor passing through the carburetor.

Past and existing efforts to increase the efficiency of the automobile engine and to reduce pollutants expelled into the atmosphere have not been successful to any substantial degree. Many prior attempts have suffered from a variety of problems such as ineffective operation, or substantial complexity of design.

Accordingly, it is an object of the present invention to provide an improved method and system for improving the efficiency and smooth operation of the automobile engine and at the same time reducing substantially the pollutants expelled from the engine.

Another object of the present invention is to provide a system for improving the efficiency of the internal combustion engine by incorporating a vacuum induction technique for supplying saturated air in conjunction with the gasoline vapor, both being mixed at the carburetor.

A further object of the present invention is to provide a combination system employing both the moisture induction technique of this invention in combination with a filter construction that provides uniform airflow through the filter to the carburetor.

Still another object of the present invention is to provide an air and moisture induction system that is of a feedback type coupling incoming filtered air, converting this to saturated air and passing this to the throat of the carburetor through a preferably small orifice. The air introduced to the carburetor is moisture laden, but preferably not in a fine mist and is introduced to the carburetor in a manner so as not to effect the fine carburetor controls and adjustments.

SUMMARY OF THE INVENTION

To accomplish the foregoing and other objects of this invention there is provided a system for increasing gasoline mileage and reducing pollutants in the emissions from a vehicle engine. This system is an air and moisture induction system adapted to supply saturated (moisture laden) air to the carburetor where it is mixed with the existing gasoline vapor. The system is preferably of the feedback type and comprises a tank for holding a quantity of a liquid which liquid is preferably a combination of a majority of water and smaller volume of a fuel additive such as alcohol. The tank is also provided with an air inlet means and an air outlet means. A first coupling line couples from the carburetor and is adapted to receive filtered air under pressure which is coupled to the air inlet means of the tank whereupon the air passes through the liquid in the tank to provide liquid saturated air normally at the top end of the tank. There is also provided a second coupling line completing the feedback loop and coupled from the air outlet of the tank to the carburetor for coupling the liquid saturated air to the carburetor throat under operating conditions and usually except at idle. The vacuum induction system is preferably used in combination with a vehicle filter or air cleaner that is of design, described herein, which provides uniform airflow into the carburetor throat essentially all about the carburetor throat. Such a filter may comprise filter sections of varying density so that the air entering the filter is equally dispersed thereabout thus entering the carburetor throat at equal force. The liquid in the tank is less than the entire volume of the tank to thus leave preferably a top air space over the liquid in which the liquid saturated air is formed. There is preferably left at least on the order of one inch at the top of the tank. In this regard the air inlet means to the tank preferably terminates within the tank in an inlet tube that extends toward the base of the tank, but is spaced from the base whereupon the air passes into the liquid and ascends to the top air space having become saturated during this transition. The air outlet from the tank is preferably taken from the top thereof at this top air space. The tank preferably is provided with a neck with both inlet and outlet coupling to the neck adjacent to each other. The second coupling line couples into the carburetor throat preferably above the throttle plate whereby when the plate is closed, such as at idle, substantially no flow occurs via the second coupling line. However, upon opening of the throttle plate flow will commence due to the vacuum that is then created essentially completing the feedback loop and feeding the saturated, moisture laden air to the carburetor throat. In the line to the carburetor there is preferably provided a metering valve so as to restrict the feed to the carburetor. This metering valve essentially forms a metering jet with a fixed orifice on the order of 0.050-0.060 inch. It is also preferred that the system employ ported vacuum which is coupled to above the throttle plate as shown hereinafter. It is also preferred that the system employ its own ported vacuum source rather than the use of any separate source. In this way there is provided a complete feedback loop as described hereinafter.

BRIEF DESCRIPTION OF THE DRAWINGS

Numerous other objects, features and advantages of the invention should now become apparent upon a reading of the following detailed description taken in conjunction with the accompanying drawings, in which:

FIG. 2 is a perspective view of an air-filter that is preferably used in the system of the present invention with the filter partially cut away to show filter construction;

FIG. 3 is a plan view of the filter depicted in FIG. 2; and

FIG. 4 is a cross-section view taken along line 4—4 of FIG. 3.

DETAILED DESCRIPTION

Figure 1:
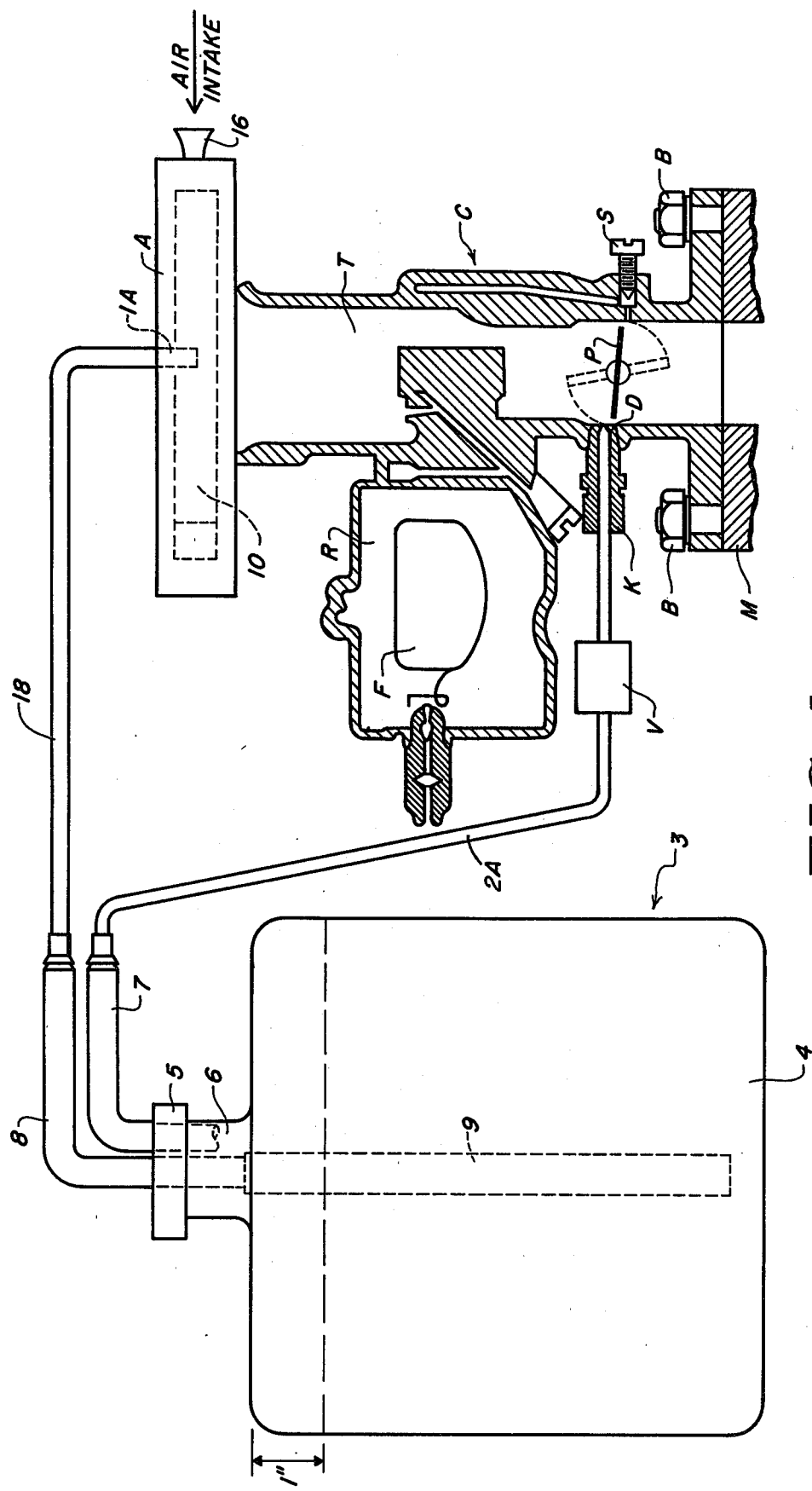
FIG. 1 illustrates the vacuum induction system of the present invention illustratively used with a typical vehicle carburetor.

FIG. 1 describes the principles of the air and moisture and induction system of the present invention as it relates to one particular carburetor design. It is understood that the concepts of the invention may be applied to virtually any type of carburetor or the like device for providing a combustible vapor. FIGS. 2-4 illustrate the preferred construction of filter employed in the induction system. The filter described in FIGS. 2-4 is in substance that taught in my co-pending application Ser. No. 213,819 now U.S. Pat. No. 4,313,740.

With reference to FIG. 1, there is shown a carburetor C which may be substantially of conventional design. The carburetor C may be secured to the engine intake manifold M by means of two or more bolts B. The carburetor C has a throat generally identified by the reference character T through which the gasoline and air pass and mix. Because the carburetion process is wellknown it is not discussed in detail herein, but it is noted that the carburetor C does include the fuel reservoir R and conventional float F. Also shown in FIG. 1 is an idle adjusting screw S and throttle plate P. The throttle plate P is, of course, controlled by the operator of the vehicle and is shown in FIG. 1 in its normally closed position or idle position. In this position of the throttle plate the induction system of this invention is essentially inactivated. The adjusting screw S does, at idle, however, permit operation even though the throttle plate is closed by way of the port at the end of the screw leading into the lower section of the carburetor throat T.

The induction system of this invention couples primarily to the coupler K leading to the carburetor throat just above the throttle plate P, and also to the air cleaner assembly A. The air cleaner assembly A is suitably supported over the top end of the throat of the carburetor. For specific details of the air cleaner assembly references made to FIGS. 2-4. In FIG. 1 in addition to the assembly A there is also shown the air intake 16. FIG. 1 also schematically illustrates the input port 1A of the input line conduit 1B.

In accordance with the principles of the present invention a vacuum induction system is employed to supply saturated air in conjunction with the gasoline vapor normally created in the carburetor. The source of the vacuum for introducing the saturated (moisture laden) air is the engine itself in conjunction with the operation of the carburetor. As mentioned previously, the air that is introduced via the coupling K to the orifice D and into the carburetor throat is moisture laden but preferably not a fine mist. Thus, the saturated air is introduced at a point close to the throttle plate but just above it in its closed position as shown in FIG. 1. This is generally a point where the vacuum draw is not at a maximum and thus a fine mist is not apt to be created at that point. Also, the input to the coupler K from the second conduit line 2A is at a point where there should be no adverse affect on the fine carburetor controls or the engine intake manifold. For the sake of illustration the lines 1B and 2A are shown relatively short, but it is understood that these could be either copper tubing or flexible rubber or neoprene tubing that could be adapted for coupling various distances.

The source of the moisture laden air or saturated air is the tank 3 which may be constructed of glass or preferably plastic. This tank is filled with a liquid 4 which may be referred to as a fuel additive which is to be vaporized and supplied to the carburetor. The tank or container 3 may be a two quart container or larger. The container is preferably filled up to about one inch from the top with the fuel additive. In a preferred embodiment the liquid 4 is water with a predetermined percentage of alcohol added thereto. The filling is facilitated by means of removal of the stopper 5 from the neck 6 of the container. The stopper 5 may support a rigid tube 7 which suitably connects to the line 2A, and a second longer rigid conduit 8 which connects to the line 1B. The conduit 7 terminates at the neck 6 and is adapted to receive the moisture laden air from the source. On the other hand the rigid conduit 8 terminates in a straight rigid tube 9 which terminates at its bottom end approximately one half inch from the bottom wall of the container.

The input port 1A of the input line 1B is adapted to funnel off intake air pressure preferably at a maximum pressure that can be obtained on the inside of the filter cartridge. This port may even extend in an upward direction to more adequately receive the intake air pressure. This maximum air intake pressure is funneled through the tube 1B and the rigid conduit 8 along with the straight section 9 into the liquid 4. The air thus passes primarily in bubbles where the air becomes saturated and escapes into the top open space above the liquid in the container. The saturated air is then drawn through the conduit 2A to the carburetor.

When the vehicle is idling there is actually substantially no activity that is taking place as far as the induction system in concerned. However, the vehicle is, of course, operating as there is a fuel mixture that passes adjacent the end of the idle adjusting screw into the throat of the carburetor below the throttle plate. This provides a relatively rich mixture for idling. At this time there is not sufficient pressure differential between the lines 1B and 2A to facilitate operation of the moisture induction system. However, when power is called for by the operator depressing the gas pedal, the throttle plate P is rotated, such as to the position shown in dotted in FIG. 1, and the primary gasoline vapor passes through the carburetor throat adjacent to the throttle plate. Upon this opening of the throttle plate the moisture saturated air is drawn from the upper chamber in the container 3 through the tube 2A and the metering valve V to the coupler K and out the orifice D. The valve V forms a metering jet and is controlled to a relatively small size such as, for example, 0.050-0.060 inch. The size of the orifice may be modified depending upon the particular carburetor to obtain the maximum moisture vapor from the conduit line 2A. It is preferred to have the orifice D above the throttle plate P in its close position as shown in FIG. 1. If the orifice D were below the throttle plate then the introduction of moisture vapor might occur even during idling where it is not necessary or desirable. Maximum moisture vapor has been found to occur at speeds of 18-20 mph but remains at speeds thereabove. The moisture vapor, as mentioned previously, ceases once the gas pedal is released with the throttle plate thus being moved to its closed position.

The induction system of the present invention is found to be particularly useful in combination with a filter of the type described in my co-pending application Ser. No. 213,819 now U.S. Pat. No. 4,313,740. With the ordinary airfilter there's apt to be variations in intake pressure depending upon where one might tap from the air intake. However, with the filter that is employed herein as described in FIGS. 2-4, there is a relatively uniform pressure all about the carburetor throat and thus the placement of a port 1A need not be made as critical. It has been found that the introduction of the moisture laden air in conjunction with the metal wool air filter increases mileage with a tuned vehicle by anywhere from 3-6 miles per gallon. The addition of the moisture laden air enhances the combustion mixture to increase engine efficiency and also reduces or eliminates engine knock by substantially reducing engine strain. There now follows a description of the preferred filter employed with the induction system of this invention.

The air filter described in FIGS. 2-4 is particularly adapted for providing increased automobile gasoline mileage and is characterized by an improved uniformity of airflow into the carburetor. In the drawing the air filter 10 is shown in conjunction with an air cleaner housing that comprises a support base 12 that usually has a peripheral side wall 13 along with an overlying cover 14. The base and cover together define a substantially closed filter chamber. FIG. 1 also shows the air inlet duct 16 which couples through the peripheral side wall to permit communication of air into the closed filter chamber. The air inlet may be directly from the ambient, or may also be coupled from another air source such as typically from the exhaust manifold area. FIG. 1 also shows the carburetor 18 upon which the support base 12 rests. The entire air cleaner housing is typically secured to the carburetor by means of an elongated bolt 19 extending from the carburetor along with a butterfly securing nut 20 for holding the cover 14 in place.

The air filter 10 consists of a circular shaped housing 22, having bottom 24, inner and outer air pervious side walls 26 and 28, top 30 and individual cartridge filters F1 through F16. Air pervious partitions P1 through P16 lie between the inner and outer pervious walls and in association with the aforementioned walls form three-sided chambers C1 through C16 which receive the individual cartridge filters F1 through F16, respectively. In a preferred embodiment, the air pervious walls form a toroid with an inner diameter of 8 inches, an outer diameter of 10 inches. The sixteen filters are basically of two different sizes including an outer array slightly larger than those in the inner array. Each array has identical size filters. As shown in FIG. 3, metal wool 32 fills each cartridge filter, with the resulting wool density falling within one of three categories: maximum, medium, or minimum. Individual cartridge filters F1 through F5 have a maximum wool density, filters F6 through F11 a medium wool density, and filters F12 through F16 a minimum wool density. The cartridge filter arrangement places the high density filters nearest air inlet 16, the low density filters farthest away from the air inlet and the medium density filters in between as shown in FIG. 2. In a preferred embodiment, aluminum or copper wool is used, and the inner and outer pervious walls are formed in a grid arrangement. The aforementioned grid may have openings approximately $\frac{3}{8}$ inch square.

Top 30 is removable, being otherwise held in place by cover 14, allowing the removal of each cartridge filter individually as required for either cleaning or replacement without the necessity of removing the entire air filter from the air cleaner housing. Fastening cover 14 holds the top in place. The air filter may also be removed as a unit for cleaning. In a preferred embodiment, housing 22 is made of plastic. The entire filter of the individual cartridge filters may be readily cleaned with a warm soap solution at periodic driving intervals.

In operation, in connection with the automotive application previously mentioned to filter air flow to the carburetor 18, air is drawn into the air cleaner housing and diffused through the cartridge filters. The air flow through the air filter 10 is generally uniform since the filter cartridge density generally decreases with distance from the air inlet, however, at the same time the air flow tends to decrease as it passes about the filter. Thus, essentially the decrease in air diffusion is compensated for by a change in the resistance to the diffusion thus providing a more uniform air flow. The uniform air flow through the air filter results in uniform air flow through the throat of the carburetor. The metal wool is a superior filter medium. It is able to trap and hold even the smallest particles of dirt and grit and does not readily deteriorate in efficiency when exposed to moist, damp or wet environments. The metal wool may also be color coded to denote wool density thereby making the replacement of filter cartridges practically foolproof. Only two different styles of cartridges are necessary.

In a preferred embodiment the metal wool has a charge maintained thereon for the purpose of attracting dust particles so that little or no dirt is permitted to enter the carburetor throat. The charging of the metal wool is accomplished through a polarizer 34 which is connected to the engine electrical system by coupling 36 and to the metal wool 32 in air filter 10 by coupling 38. With the engine electrical system as a source of current, the polarizer controls the amount of current applied to the metal wool which attracts the dust particles brought into the air cleaner housing through inlet 16.

While specific embodiments have been shown and described, many variations are possible. The particular shape of the air filter housing and air filter including all horizontal and vertical dimensions may be changed as desired to suit the equipment with which it is used. The housing materials may vary although plastic is preferred. The configuration and number of the chambers may vary although the preferred embodiment shown 16 individual cartridge filters in their respective chambers. Also, in the embodiment described, there have been described air pervious partitions. In a more simplified version of the invention, partitions may be removed with the filters simply being supported between the side walls. In another embodiment in place of a petition a small ridge could be used in the base to locate the filter cartridges.

What is claimed is:

1. A system for increasing gasoline mileage and reducing pollutants in the emissions from a vehicle engine having combustion means including an engine carburetor, engine manifold and air filter associated with the carburetor, said system comprising;
   means for securing the engine carburetor to the vehicle intake manifold in a position for downdraft operation,
   a tank for holding a quantity of a liquid and having air inlet means and air outlet means,
   a first coupling line coupled from the air filter receiving air under pressure for coupling directly to the air inlet means of the tank, whereupon the air passes through the liquid in the tank to provide liquid saturated air in the tank,
   said tank having the liquid therein occupying less than the entire volume of the tank to thus leave a top air space over the liquid in which the liquid saturated air is formed,
   a second coupling line coupling to the carburetor throat above but close to the throttle plate in the closed position thereof but within the radius of the throttle plate in the open position thereof, whereby when the plate is closed as at idle substantially no flow occurs via the second coupling line but upon opening the flow commences through the throat, and a metering valve in said second coupling line for controlling the amount of saturated air feed to the throat of the carburetor, said metering valve being of small orifice diameter having a maximum on the order of 0.060 inch wherein the air filter provides filtered air via the first coupling line to the tank, said air filter comprising a plurality of replacable cartridge filters, said filters each being of uniform density with different ones thereof having different porosity with the more dense filter disposed closer to an air inlet and the less dense filter disposed remote from the air inlet with said dense to less dense filters extending circumferentially whereby uniform air dispersion occurs through the filters.

2. A system as set forth in claim 1 wherein the tank has a neck with both inlet and outlet means coupling to the neck adjacent to each other.

3. A system as set forth in claim 1 wherein the top air space is at least on the order of one inch.

4. A system as set forth in claim 1 wherein the liquid comprises water and a combustible liquid.

5. A system as set forth in claim 4 wherein the combustible liquid includes alochol.

6. A system as set forth in claim 1 wherein the air inlet means terminates within the tank in an inlet tube extending toward the base of the tank but terminating spaced from the base whereupon the air passes into the liquid and ascends to the top air space having become saturated.

7. A system as set forth in claim 6 wherein the air outlet means from the tank is taken from the top air space.

* * * * *